(No Model.) 3 Sheets—Sheet 1.
T. H. SAMPSON.
APPARATUS FOR TREATING LUMBER.
No. 419,798. Patented Jan. 21, 1890.
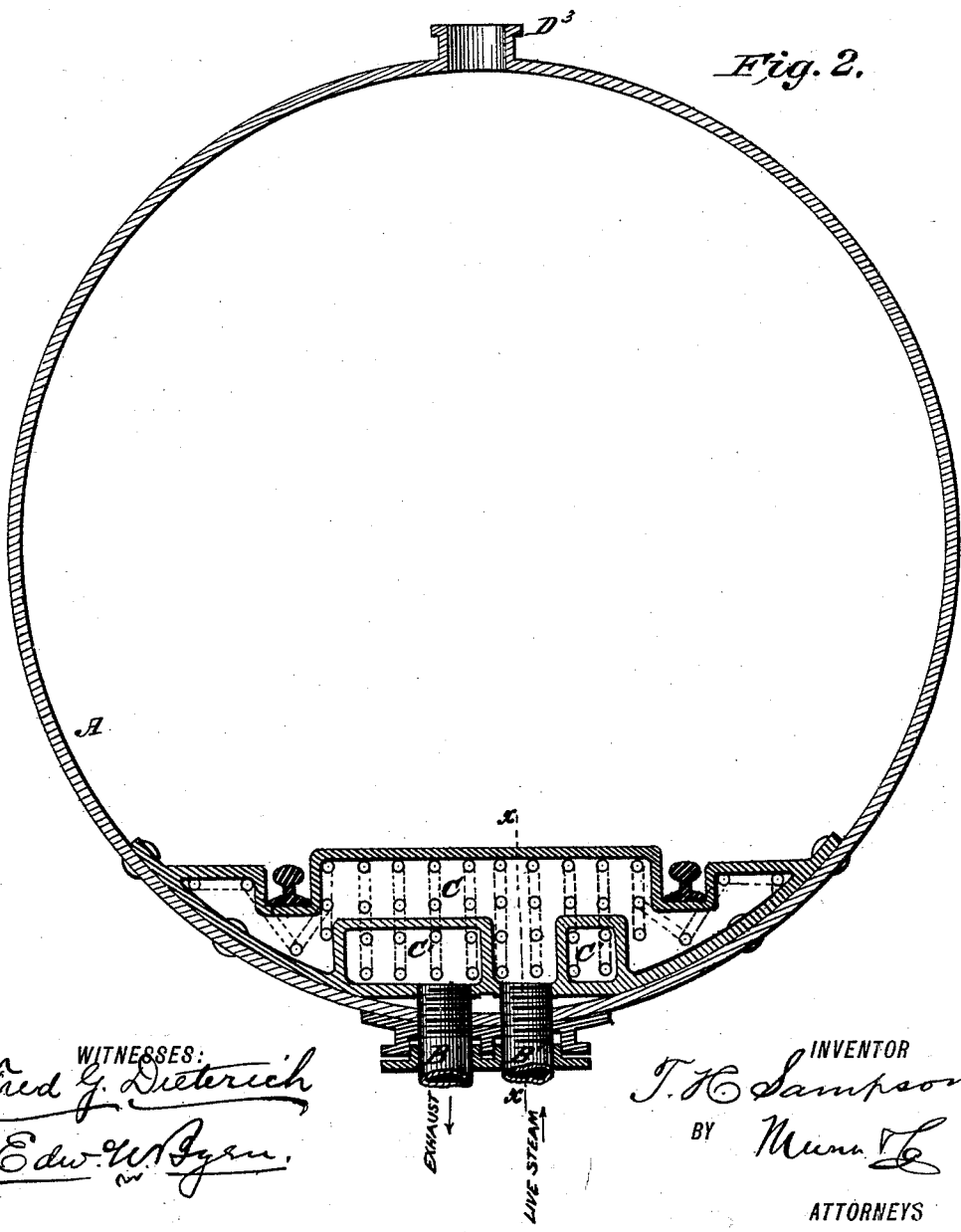

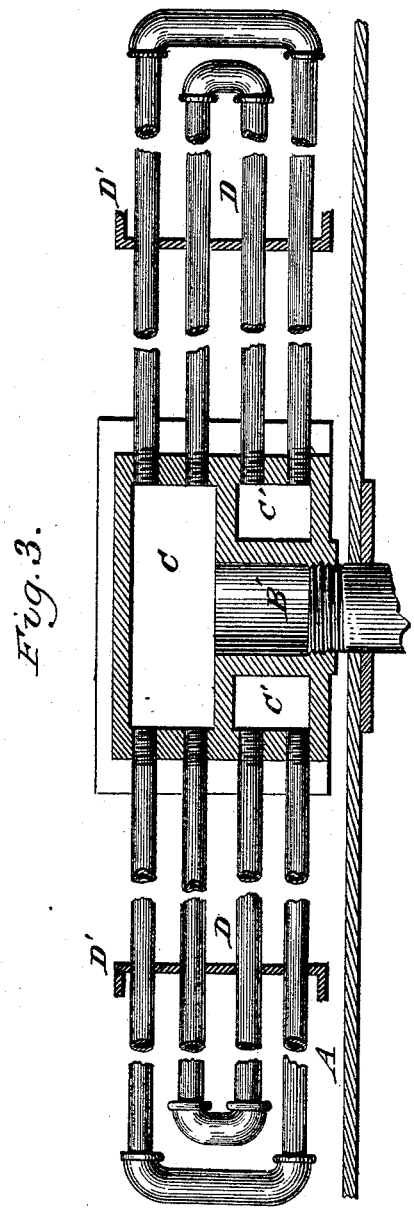

(No Model.) 3 Sheets—Sheet 3.
T. H. SAMPSON.
APPARATUS FOR TREATING LUMBER.

No. 419,798. Patented Jan. 21, 1890.

WITNESSES: Fred G. Dieterich
Edw. G. Byrn.

INVENTOR
T. H. Sampson
BY Munn & Co
ATTORNEYS

United States Patent Office.

THOMAS HARLOW SAMPSON, OF NEW ORLEANS, LOUISIANA.

APPARATUS FOR TREATING LUMBER.

SPECIFICATION forming part of Letters Patent No. 419,798, dated January 21, 1890.

Application filed June 13, 1888. Serial No. 276,958. (No model.)

*To all whom it may concern:*

Be it known that I, THOMAS HARLOW SAMPSON, a citizen of the United States, residing at New Orleans, in the parish of Orleans and State of Louisiana, have invented a new and useful Improvement in Apparatus for Preventing Warping and Twisting of Lumber, of which the following is a specification.

My invention relates to apparatus for treating lumber for the purpose of preventing the warping and twisting of the same; and it consists in the peculiar construction and arrangement of the parts of the apparatus hereinafter described, and pointed out in the claims.

Figure 4:
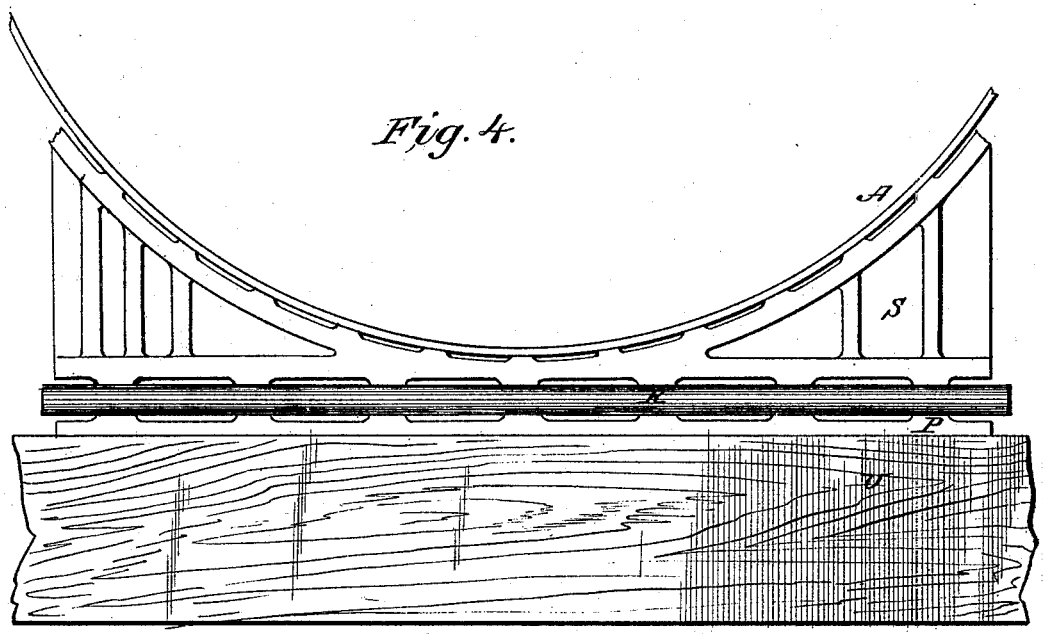
Figure 5:
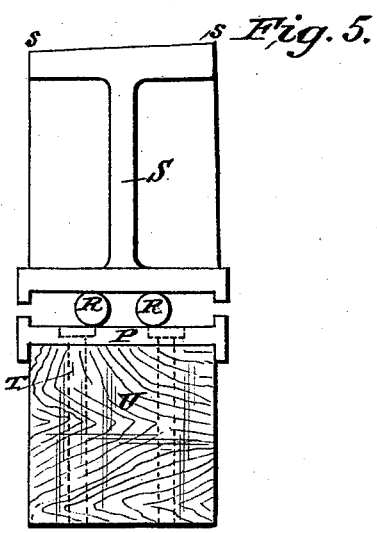

Figure 1 is a side elevation of the apparatus. Fig. 2 is an enlarged central cross-section; Fig. 3, a vertical longitudinal section through line $x$ $x$ of Fig. 2, and Figs. 4 and 5 are detail views of the side and end of one of the saddles or supports for the cylinder.

A is an iron shell or cylinder of six feet diameter by one hundred feet long, with closing heads E E', so as to allow the cylinder to be made air-tight. In the center of the bottom part of the cylinder is a cast-iron manifold box C C', which is fastened to the bottom of the shell, and one compartment of which C has an inlet B' for live steam, and the other compartment of which C' has a steam-exhaust B.

D are a series of pipes returned upon themselves and having one end connected with one compartment C and the other with the other compartment C', so that steam may circulate therein throughout the lower portion of the cylinder. To the pipes B B' (made tight to the cylinder by means of stuffing-boxes) are connected boilers for furnishing steam at a pressure of one hundred and fifty pounds per square inch. By this arrangement I provide for heating the contents of the cylinder during the process. On the top of said cylinder there are three twelve-inch openings $D^2$ $D^3$ $D^4$, one to admit live steam from the boilers to the cylindrical shell, and the second to allow escape-steam of boilers to pass off and to hold pressure and vacuum gages and safety-valves, and the third to connect with a vacuum-pump. The cylinder itself is given an inclination of one-half inch to the foot, having at its lower end a six-inch opening and valve $v$. The manifold is placed and riveted in the middle of cylinder, so that the strains upon the manifold and cylinder plates, by constant cooling and heating, will be evenly balanced, supports D' for the coils of pipes being placed at suitable intervals.

The object in giving the slant or inclination to cylinder is to enable the wood to be treated with that portion of the lumber which forms the butt-end of the log resting lower than the other end, so that the sap will run out of it from gravity, when being treated, in the same way that it does from the standing tree. I find that this arrangement of cylinder greatly facilitates the process and permits the lumber to be loaded upon trucks or cars and run directly into the cylinder upon its tracks at the proper inclination.

In Figs. 4 and 5 is shown one of a set of supports or saddles for the cylinder. These saddles will consist of a top or bearing piece S, a bottom piece P, of cast-iron, and two rollers R R, two inches in diameter, constructed as shown in the drawings. There will be eight saddles, as above, and one saddle consisting of the top or bearing piece only, the bottom piece and rollers to be omitted. The shell of the cylinder bears evenly on all the chipping-strips of the upper or bearing piece of saddle and the bottom of upper piece, as also the top of the bottom piece to be planed so as to form an even and true surface, so that the rollers may move evenly and truly. The rollers are to be of iron, two inches in diameter, and turned and set at right angles to the cylinder. The bottom piece is provided with holes for one inch, holding down bolts T, which pass through wooden sills U, as shown. The cylinder will be set to have a slant or incline of one-half inch to the foot, equal to one end being fifty inches higher than the other end. The top surface $s$ $s$ of saddle will be beveled to receive the cylinder set to this incline, the bottom to set level.

The cylinder, when set, will have an even bearing on all the saddles, and the saddles have an even bearing on all the rollers. The saddle under the center of cylinder will have no rollers or bottom piece, and the top or bearing piece of this saddle will rest on the timber and will be secured by bolts, the same as the bottom parts of the saddles. The object of these saddles and rollers is to prevent the great strain upon the sheets of cylinder caused by contraction and expansion of cylinder by constant heating and cooling, as would be the case if supported upon solid foundations.

I am aware that it is not new in lumber-driers to heat a cylinder by means of a simple steam-coil whose induction-pipe enters the cylinder at one point and leaves it at another. I am also aware that steam-radiators have been made with U-shaped coils, one set of ends of which were connected to one steam-compartment and the other ends to another steam-compartment in a manifold box.

My invention is distinguished by the following features: In the first place, it is designed mainly for treating lumber in a vacuum in the cylinder, and hence all leakage at the joints of the steam-pipe and between the steam-pipes and the cylinder must be prevented. Any ordinary coil which passes through the cylinder at two different points will, from expansion and contraction, inevitably involve leakage and prevent a vacuum. With my manifold box, having its two compartments C C' connected to the middle of the cylinder, and having its coils extending therefrom to the ends of the cylinder on both sides of the box without passing through the cylinder, and properly supported upon plates D', it will be seen that there is no loosening of joints from differential rate of expansion and contraction between the coils and the cylinder, and no leakage, the thrust or pull of the coils on one side of the box being neutralized by the thrust or pull of the coils upon the other side; furthermore, this disposition of coils upon opposite sides of the manifold box and extending to the ends of the cylinder permits either head of the cylinder to be removed and any one of the coil of pipes to be replaced or repaired without disturbing the others when it becomes necessary from wear or other cause. The manifold box is made to fit the cross-section of the interior of the cylinder, as do also the plates D', and in depressions in the manifold box are seated the rails (see Fig. 2) which sustain the trucks carrying the lumber.

Having thus described my invention, what I claim as new is—

1. An apparatus for treating lumber, consisting of the combination of an outer cylindrical shell, a manifold box curved to fit the cross-section of the bottom of the cylinder and having compartment C with opening B' leading thereto, and compartment C' with opening B, the said box being connected to the middle of the cylindrical shell and a series of coils arranged upon one side of the manifold box and extending along the bottom of the cylinder without rigid connection thereto and having one set of ends communicating with compartment C and the other set of ends communicating with compartment C', a corresponding series of coils arranged similarly upon the opposite side of the manifold box, and supports D' D' for sustaining the ends of these coils, substantially as and for the purpose described.

2. The combination of the cylindrical shell A, having openings $D^2$ $D^3$ $D^4$, the saddles or supports consisting of upper section S, having inclined surfaces s s, for maintaining the cylinder in an inclined position, the plates P and rollers R, placed between the plates and the upper sections, the manifold box with two compartments C C', having induction and eduction pipes B B' extending through the middle of the cylinder, and two sets of coils arranged upon opposite sides of the manifold box and communicating with its two compartments and extending longitudinally along the cylinder, and supports for the coils arranged within the cylinder, substantially as shown and described.

THOMAS HARLOW SAMPSON.

Witnesses:
WM. RENAUDIN,
JEFF. C. WRUCK.